United States Patent [19]
Nakayama et al.

[11] Patent Number: 6,048,597
[45] Date of Patent: Apr. 11, 2000

[54] OPTICAL DEVICE AND MANUFACTURING METHOD THEREOF

[75] Inventors: Hiroshi Nakayama; Etsuro Ikeda, both of Miyagi, Japan

[73] Assignee: Sony Corporation, Tokyo, Japan

[21] Appl. No.: 09/169,992

[22] Filed: Oct. 13, 1998

[30] Foreign Application Priority Data

Oct. 14, 1997 [JP] Japan .................................. 9-280824

[51] Int. Cl.⁷ ...................................................... B32B 3/00
[52] U.S. Cl. ............... 428/64.1; 428/64.4; 428/694 ML; 428/694 XS; 428/694 MM; 428/913; 430/270.12; 430/495.1; 430/945; 369/283; 369/288
[58] Field of Search .................................. 428/64.1, 64.4, 428/688, 689, 694 R, 694 ML, 694 SC, 694 XS, 694 MM, 913; 430/270.11, 270.12, 495.1, 945; 369/283, 288

[56] References Cited

U.S. PATENT DOCUMENTS

| | | | |
|---|---|---|---|
| 5,577,020 | 11/1996 | Utsunomiya | 369/275.2 |
| 5,585,197 | 12/1996 | Ikeda | 428/611 |
| 5,822,282 | 10/1998 | Nakayama | 369/13 |
| 5,876,858 | 3/1999 | Ikeya | 428/611 |
| 5,889,740 | 3/1999 | Nqakayama | 369/13 |
| 5,982,713 | 11/1999 | Nakayama | 369/13 |

*Primary Examiner*—Elizabeth Evans
*Attorney, Agent, or Firm*—Hill & Simpson

[57] ABSTRACT

An optical disc in which a desired exchange reciprocal action is displayed between two sorts of the rare earth-transition metal alloy films to realize optimum recording/reproducing characteristics, and a manufacturing method for the optical disc. To this end, an optical disc 1 includes a first rare earth-transition metal alloy film containing rare earth elements and transition elements and a second rare earth-transition metal alloy film layered on the first rare earth-transition metal alloy film. The second rare earth-transition metal alloy film has a composition different from that of the first rare earth-transition metal alloy film and contains rare earth elements and transition elements. An oxidized area defined between the first rare earth-transition metal alloy film and the second rare earth-transition metal alloy film has an oxygen content not higher than 2.5 atom % and a thickness not larger than 7 nm.

4 Claims, 10 Drawing Sheets

OPTICAL DEVICE AND MANUFACTURING METHOD THEREOF

BACKGROUND OF THE INVENTION

1. Field of the Invention

This invention relates to an optical disc having two layers of different rare earth-transition metal alloy films, and a manufacturing method for this optical disc.

2. Description of the Related Art

Among rewritable optical discs, there are a magneto-optical disc and a phase-change disc. In particular, with the magneto-optical disc, magnetic domains are written on magnetic thin films, by way of recording the information by exploiting the thermal energy, such as semiconductor laser, and the information thus recorded is read out using the photomagnetic effect.

As the recording materials used for this magneto-optical disc, films of rare earth-transition metal alloys, obtained on combining rare earth elements, such as Gd, Tb or Dy, and transition metals, such as Fe or Co, are predominantly used. As the magneto-optical disc employing the films of rare earth-transition metal alloys, such a magneto-optical disc is proposed in which the rare earth-transition metal alloy film is sandwiched between dielectric films of, for example, $Si_3N_4$, and a reflective film of, for example, Al, is formed on one or the other dielectric film, to provide a four-layer structure.

Heretofore, the above-described magneto-optical disc is of a recording format in which a TbFeCoCr alloy film is used as the rare earth-transition metal alloy film and in which recording/reproduction is performed with a track pitch of approximately 1.6 $\mu$m and a bit length of approximately 0.83 $\mu$m.

Conventionally, with an increasing demand for higher recording density, such a recording format is proposed in which the track pitch is approximately 1.6 $\mu$m and the pit length is approximately 0.83 $\mu$m for recording/reproduction.

Also, there is recently raised a demand for higher recording density, such that a recording format which reduces the track pitch and the pit length further has been proposed. For example, in the above-described magneto-optical disc, the track pitch and the pit length are set to approximately 0.9 $\mu$m and to approximately 0.45 $\mu$m, respectively, in order to achieve higher recording density. However, if, in the above-described magneto-optical disc, the track pitch and the pit length are reduced further for achieving higher recording density, the playback output is lowered, such that recording/reproduction cannot be realized.

It may be envisaged to improve photomagnetic effects of the TbFeCoCr alloy film. With this magneto-optical disc, it suffices if the Kerr rotation angle of the rare earth-transition metal alloy film is increased for the laser light illuminated for playback. In order to realize this, it suffices to eliminate Cr from the TbFeCoCr alloy film, that is to use a TbFeCo alloy film. If the TbFeCo alloy film is used as a recording material, the Kerr rotation angle of the laser light illuminated on the recording layer is increased, as a result of which the playback output is improved.

However, this TbFeCo alloy film is not optimum in magnetic properties, as compared to a TbFeCoCr alloy film with an oxide film deposited thereon, such that a magnetic domain cannot be formed satisfactorily in a low external magnetic field. Thus, with a magneto-optical disc employing the TbFeCo alloy film as a recording material, recording cannot be made satisfactorily with an external magnetic field only large enough to make recording on the TbFeCoCr alloy film carrying an oxide film.

Also, the TbFeCo alloy film is formed by sputtering in an Ar gas atmosphere. If an oxygen gas is mixed, Tb of the TbFeCo alloy film is selectively oxidized, because Cr is not contained therein. If Tb is selectively oxidized in the TbFeCo alloy film, magnetic characteristics are deteriorated. That is, with the present TbFeCo alloy film, it is different to control the film thickness to form the oxide film, such that, if it is attempted to deposit an oxide film, an excessively oxidized state is produced. The result is that the magneto-optical disc has only poor recording/reproducing characteristics.

As a magneto-optical disc, developed to eliminate this inconvenience, there is known such a disc which has two sorts of the rare earth-transition metal alloy films. Specifically, the magneto-optical disc is of a layered structure of a GdFeCo alloy film and a TbFeCo alloy film. With this magneto-optical disc, the force of magnetic coupling by exchange reciprocal action operates between the GdFeCo alloy film and the TbFeCo alloy film, thus improving magnetic characteristics on the whole.

However, if a magneto-optical disc having two sorts of the rare earth-transition metal alloy film is actually produced, the exchange reciprocal action between the GdFeCo alloy film and the TbFeCo alloy film is not displayed satisfactorily such that the desired magnetic coupling force is not produced.

SUMMARY OF THE INVENTION

It is therefore an object of the present invention to provide an optical disc in which a desired exchange reciprocal action is displayed between two sorts of the rare earth-transition metal alloy films to display optimum recording/reproducing characteristics.

It is another object of the present invention to provide a manufacturing method for an optical disc in which a desired exchange reciprocal action can be displayed between two sorts of the rare earth-transition metal alloy films.

As a result of our perseverant researches, the present inventors have found that the strength of the exchange reciprocal action produced between the two sorts of the rare earth-transition metal alloy films depends on the degree of oxidation occurring between the two films. The exchange reciprocal action produced between the two sorts of the rare earth-transition metal alloy films operates most strongly between the transition metal elements of one of the films and the transition metal elements of the other film, and means coupling between the transition metal elements of one of the films and the transition metal elements of the other film in a state of spin in mutually anti-parallel directions. The present inventors have found that, by setting the degree of oxidation occurring between the two sorts of the rare earth-transition metal alloy films, recording can be achieved even with the small external magnetic field. This finding has led to completion of the present invention.

In one aspect, the present invention provides an optical disc including a first rare earth-transition metal alloy film containing rare earth elements and transition elements, and a second rare earth-transition metal alloy film layered on the first rare earth-transition metal alloy film. The second rare earth-transition metal alloy film has a composition different from that of the first rare earth-transition metal alloy film and contains rare earth elements and transition elements. An oxidized area defined between the first rare earth-transition metal alloy film and the second rare earth-transition metal alloy film has an oxygen content not higher than 2.5 atom % and a thickness not larger than 7 nm.

With the optical disc of the present invention, the thickness and the oxygen content in the oxidized area on the interface between the first rare earth-transition metal alloy film and the second rare earth-transition metal alloy film are prescribed to defined values. Thus, with the present optical disc, the exchange reciprocal action operates satisfactorily between the first rare earth-transition metal alloy film and the second rare earth-transition metal alloy film, so that, with the present optical disc, there result optimum magnetic characteristics of the first rare earth-transition metal alloy film and the second rare earth-transition metal alloy film.

In another aspect, the present invention also provides a method for producing an optical disc including a step of forming on a substrate a first rare earth-transition metal alloy film containing rare earth elements and transition elements, and a step of forming a second rare earth-transition metal alloy film on the first rare earth-transition metal alloy film so that an oxidized area on an interface between the first rare earth-transition metal alloy film and the second rare earth-transition metal alloy film will be 7 nm or less and so that the oxygen content in an oxidized area will be 2.5 atom % or less.

With the present manufacturing method of the present invention, the state of oxygen in the oxidized area on the interface between the first rare earth-transition metal alloy film and the second rare earth-transition metal alloy film can be optimized, so that there is generated satisfactory exchange reciprocal action between the first rare earth-transition metal alloy film and the second rare earth-transition metal alloy film. Thus, with the present technique, the first rare earth-transition metal alloy film and the second rare earth-transition metal alloy film can be improved in magnetic characteristics and hence an optical disc may be produced which enables satisfactory recording even with a low recording magnetic field.

Specifically, with the present optical disc, in which the oxygen content and the thickness of the oxidized area on the interface between the first rare earth-transition metal alloy film and the second rare earth-transition metal alloy film. Thus, with the present optical disc, the magnetic characteristics of the first rare earth-transition metal alloy film and the second rare earth-transition metal alloy film can be optimized to enable optimum recording even for a low magnetic field.

Also, with the present manufacturing method for the optical disc, the first rare earth-transition metal alloy film and the second rare earth-transition metal alloy film having superior magnetic properties can be formed to provide an optical disc which allows for satisfactory recording even with a low magnetic field.

DESCRIPTION OF THE PREFERRED EMBODIMENTS

Referring to the drawings, an optical disc and an optical disc manufacturing method according to preferred embodiments of the present invention will be explained in detail.

Figure 1:
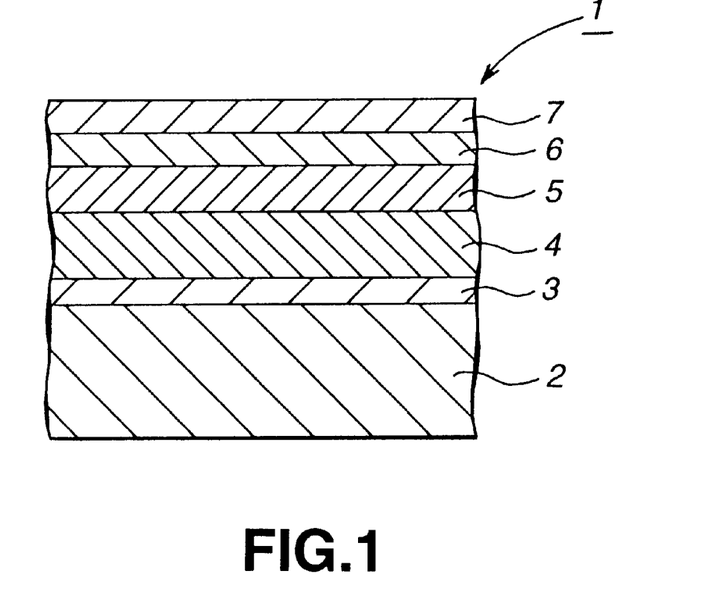
FIG. 1 is a schematic cross-sectional view of an optical disc according to the present invention.

An optical disc 1, shown in FIG. 1, includes a disc-shaped substrate 2, a first dielectric film 3, formed on the substrate 2, a first rare earth-transition metal alloy film 4, a second rare earth-transition metal alloy film 5, formed on this first rare earth-transition metal alloy film 4, a second dielectric film 6, formed on this second rare earth-transition metal alloy film 5 and a reflective film 7 formed on the second dielectric film 6.

In this optical disc 1, the substrate 2 may be formed of a routinely used material, such as synthetic resin, e.g., polycarbonates, or glass. The first dielectric film 3 and the second dielectric film 6 maybe formed of, for example, $Si_3N_4$. The reflective film 7 may be formed of, for example, Al. However, the materials that go to make up the respective layers may be of any known materials and are not limited to the above specified materials.

Also, in the present optical disc 1, the first rare earth-transition metal alloy film 4 is e.g., a GdFeCo alloy film, while the second rare earth-transition metal alloy film 5 is e.g., a TbFeCo alloy film. However, according to the present invention, the materials that go to make up the first and second rare earth-transition metal alloy films 4, 5 may be of any suitable material containing an alloy of rare earth elements and transition elements, without being limited to the above specified materials.

In the present optical disc 1, an oxidized area in an interface between the first and second rare earth-transition metal alloy films 4, 5 is not larger than 7 nm, with the oxygen content in this oxidized area being not larger than 2.5 atom %. In this optical disc 1, the first and second rare earth-transition metal alloy films 4, 5 are formed by thin film forming means, such as sputtering or vacuum evaporation, as will be explained in detail, with the oxidized area being limited to the above range.

Figure 2:
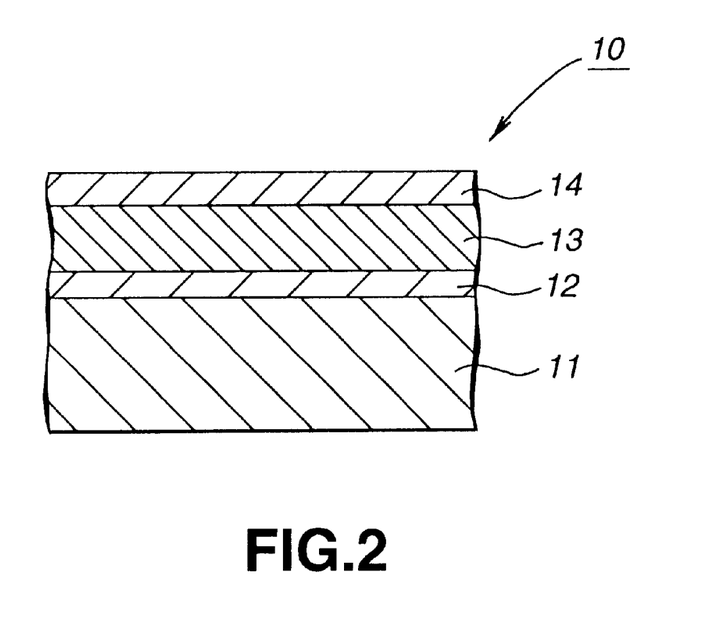
FIG. 2 is a schematic longitudinal cross-sectional view of a disc having an oxidized area of a thin film.
Figure 3:
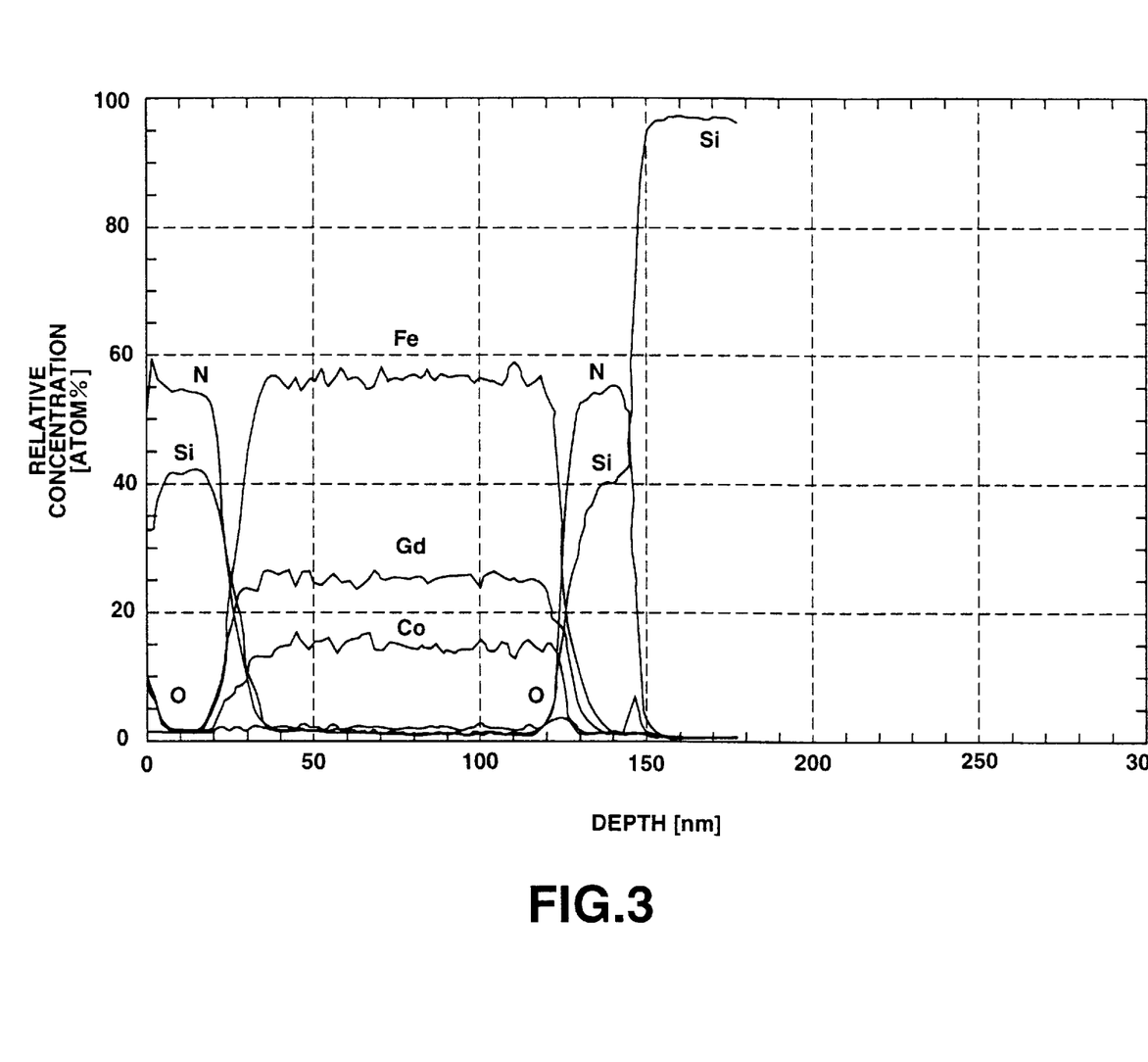
FIG. 3 is a graph showing AES analysis of the disc shown in FIG. 2.

Specifically, the optical disc 1 can be produced by a sputtering device, not shown, used for producing the optical disc 1 shown in FIG. 2. That is, this disc 10 has a structure which is comprised of a first dielectric film 12, a GdFeCo alloy film 13 and a second dielectric film 14, formed in this order on a silicone wafer 11. FIG. 3 shows the results of AES analysis performed from the second dielectric film 14. In FIG. 3, the abscissa denotes the depth of a disc 10, with the surface of the second dielectric film 14 being set to 0 nm, and the ordinate denotes the relative concentration of respective elements.

Figure 4:
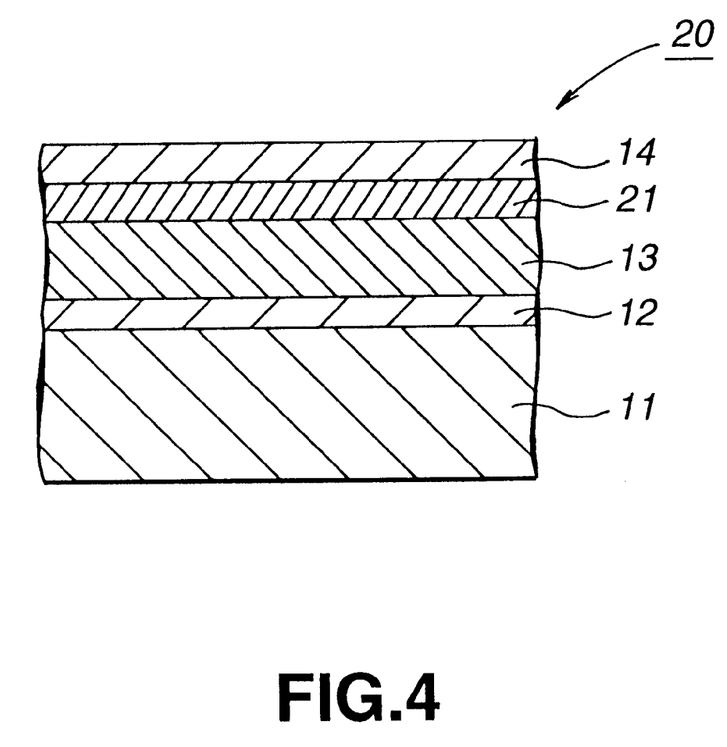
FIG. 4 is a schematic longitudinal cross-sectional view of a disc having an oxidized area of a thick film.

For comparison to the disc 10, a disc 20 having an oxidized area of a thick film on an interface between the GdFeCo alloy film 13 and the second dielectric film 14, as shown in FIG. 4, was produced. That is, in this disc 20, the first dielectric film 12 and the GdFeCo alloy film 13 are formed in this order on the silicone wafer 11. Also, in this disc 20, the GdFeCo alloy film 13 is oxidized to form an oxidized layer 21 on which the second dielectric film 14 is formed. For this disc 20, AES analysis was also carried out, as in the case of the above-mentioned disc 10. The results are shown in FIG. 5.

Figure 5:
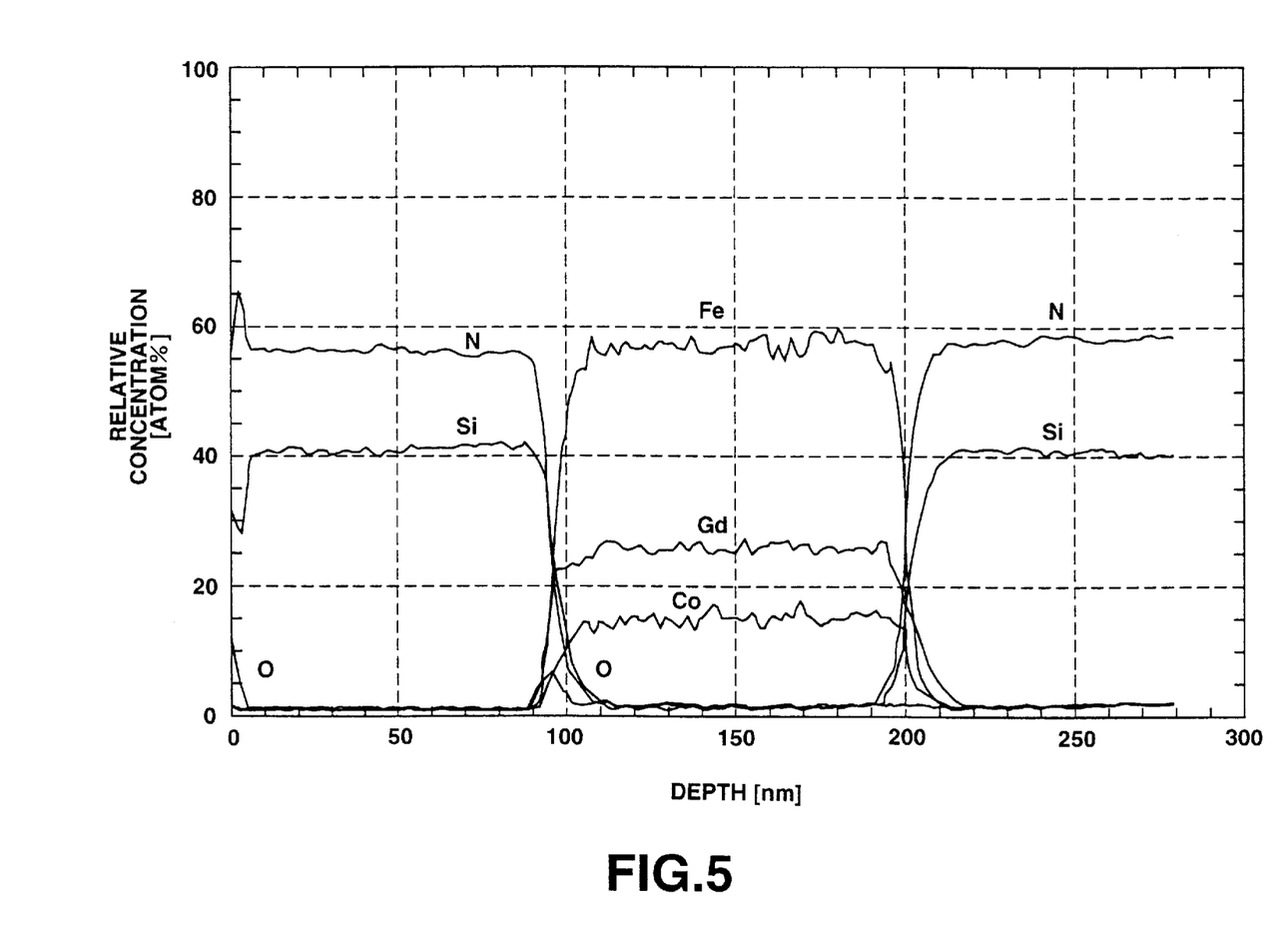
FIG. 5 is a graph showing AES analysis of the disc shown in FIG. 4.
Figure 6:
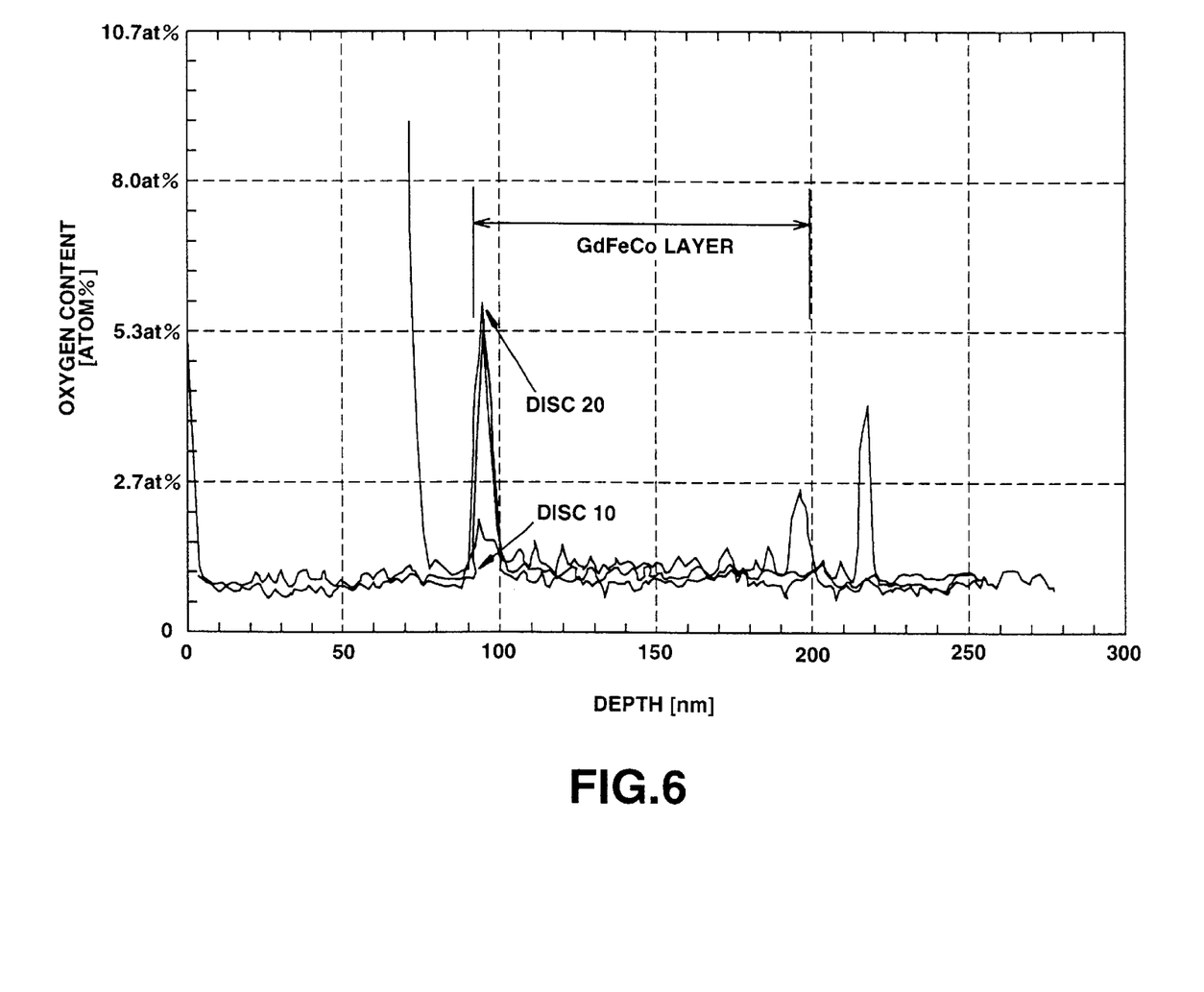
FIG. 6 is a graph showing the results of AES analysis in the vicinity of the oxidized area of FIGS. 3 and 5 to an enlarged scale.

FIG. 6 shows, to an enlarged scale, an interface portion between the second dielectric film 14 and the GdFeCo alloy film in FIGS. 3 and 5, in order to show only a profile concerning oxygen. As may be seen from FIG. 6, the oxidized area on an interface between the GdFeCo alloy film 13 and the second dielectric film 14 is approximately 6 nm in thickness, with the oxygen content in the oxidized area being approximately 1.2 atom %. With the disc 20, the oxygen content of the oxidized area, that is the oxidized layer 21, is approximately 5.8 atom %, with the thickness of the oxidized area, that is the oxidized layer 21, being approximately 7 nm.

Meanwhile, the thickness of the oxidized area was set as the total half-value width of an oxygen identifying peak, while the oxygen content of the oxidized area was set as the peak value of the oxygen identifying peak.

Using a sputtering device, as used for producing the disc 10 shown in FIG. 3, the optical disc 1 shown in FIG. 1 was produced. Similarly, using a sputtering device as used for producing the disc 20 shown in FIG. 5, an optical disc 30 shown in FIG. 7 was produced. That is, this optical disc 30 has an oxidized layer 31 of the oxygen content of approximately 5.8 atom % between the first rare earth-transition metal alloy film 4 and the second rare earth-transition metal alloy film 5. In addition to the optical disc 30, an optical disc having the oxygen content of the oxidized area of 3.8 atom %, was also prepared.

For the optical disc 1 and the optical disc 30, thus prepared, the relation between the recording magnetic field and the CN ratio was checked. As may be seen from FIG. 8, the CN ratio of the optical disc 1 is not less than 40 dB, even if the recording magnetic field is as low as approximately 100 Oe. Conversely, the CN ratio of the optical disc 30 is lower at all times than that of the optical disc 1 and is of the order of 35 dB at most. On the other hand, the CN ratio of the optical disc having the oxygen content of the oxidized area of 3.8 atom % is at all times lower than that of the optical disc 1, and is of the order of 38 db at most.

Figure 8:
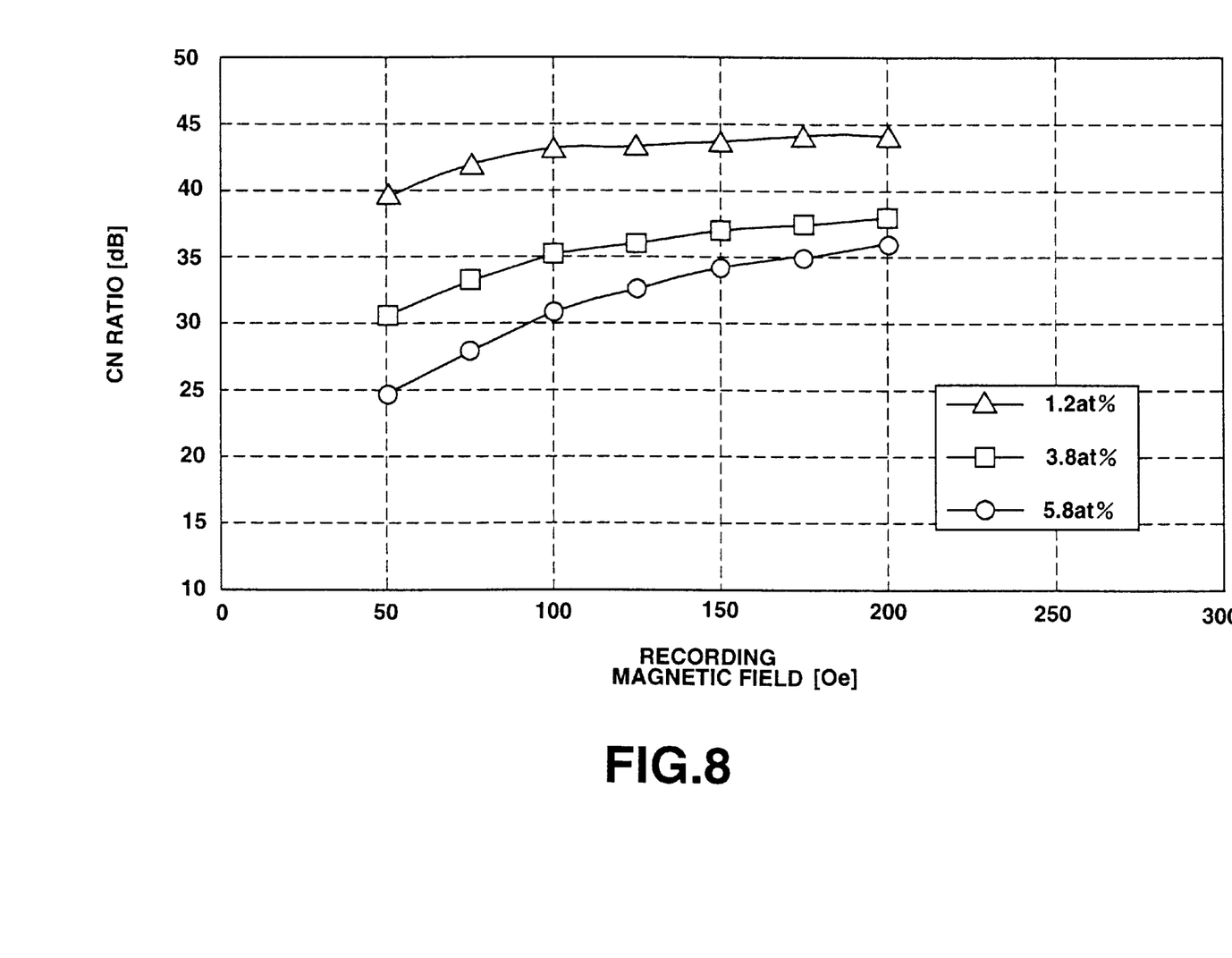
FIG. 8 is a graph showing the relation between the magnitude of the recording magnetic field and the CN ratio.

If, in the optical disc 1, the track pitch is approximately 0.9 μm and the pit length is 0.45 μm, for example, the CN ratio not lower than 40 dB is required for the recording magnetic field of 150 Oe. The above-described optical disc 1 meets this condition. Conversely, with the optical disc 30, the CN ratio is significantly lower than 40 db and is approximately 34 dB for the recording magnetic field of 150 Oe. The CN ratio is not in excess of 40 dB for the recording magnetic field of 150 Oe, even with the optical disc having the oxygen content of the oxidized area of 3.8 atom %. Therefore, with the optical disc 30, it is not possible to increase the track pitch and the pit length to approximately 0.9 μm and to 0.45 μm, respectively, for the purpose of achieving high recording density.

Thus, the optical disc 1 is in meeting with the format for the track pitch of approximately 0.9 μm and the pit length of approximately 0.45 μm for achieving high recording density. The reason is that the exchange reciprocal action operates satisfactorily between the first rare earth-transition metal alloy film 4 and the second rare earth-transition metal alloy film 5 to improve magnetic characteristics. Meanwhile, this reciprocal exchange action operates between rare earth elements or transition elements of the first rare earth-transition metal alloy film 4 and the transition elements or rare earth elements of the second rare earth-transition metal alloy film 5. There is established exchange coupling between the rare earth elements and the transition elements between which operates the exchange reciprocal action. The result is that the first rare earth-transition metal alloy film 4 and the second rare earth-transition metal alloy film 5 permit optimum recording even for a low magnetic field.

Figure 7:
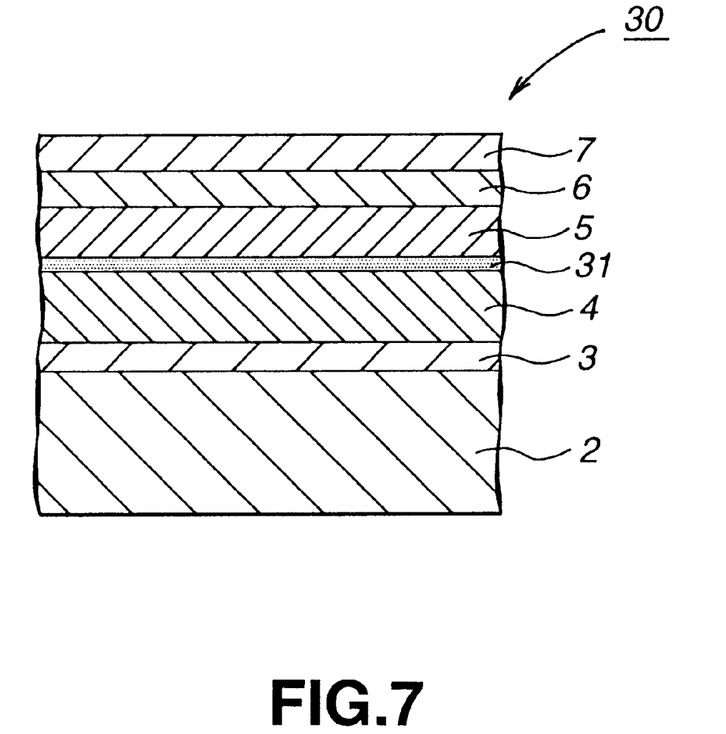
FIG. 7 is a schematic longitudinal cross-sectional view of an optical disc having an oxidized area of a thick film.

Conversely, the above-described exchange reciprocal action is not in operation satisfactorily with the optical disc 30 in which the oxygen content of the oxidized layer 31 is a high value. Thus, with the optical disc 30, the magnetic characteristics are deteriorated, such that recording cannot be achieved satisfactorily for the low magnetic field.

Moreover, with the optical disc 30, rare earth elements on the interface between the first rare earth-transition metal alloy film 4 and the second rare earth-transition metal alloy film 5 are selectively oxidized, as a result of which the interface between the first rare earth-transition metal alloy film 4 and the second rare earth-transition metal alloy film 5 is transition element rich at the same time as the perpendicular magnetic anisotropic energy constant is lowered. Therefore, with the optical disc 30, the magnetic characteristics are deteriorated, such that recording cannot be achieved satisfactorily for the low magnetic field.

Meanwhile, it is recognized that, with the above-described optical disc 1, the CN ratio needs to be in excess of 40 dB for the recording magnetic field of 150 Oe. Thus, with the above-described optical disc 1, the thickness and threshold values of the oxygen content of the oxidized area formed on the interface between the first rare earth-transition metal alloy film 4 and the second rare earth-transition metal alloy film 5 was checked.

First, the oxygen content of the oxidized area was found by preparing a plurality of optical discs, in which the thickness of the oxidized area was constant at X nm and the oxygen content of the oxidized area was varied, and by measuring the CN ratio at the recording magnetic field of 150 Oe for each disc. The results are shown in FIG. 9.

Figure 9:
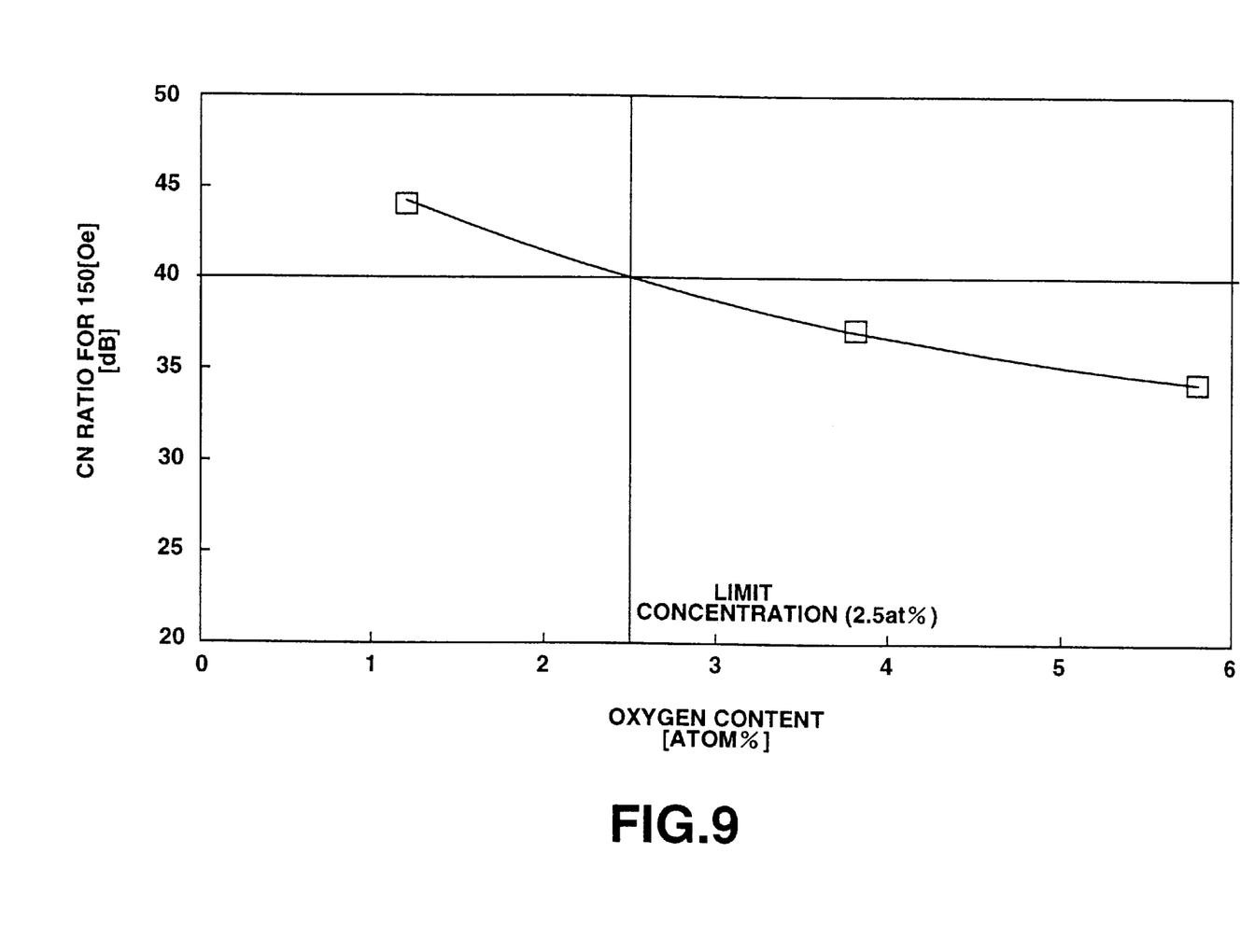
FIG. 9 is a graph showing the relation between the oxygen content of an oxidized area and the CN ratio.

As may be seen from FIG. 9, it is when the oxygen content of the oxidized area is 2.5 atom % or lower that the CN ratio at the recording magnetic field of 150 Oe is 40 db or higher. Stated differently, should the oxygen content of the oxidized area of the optical disc 1 be 2.5 atom % or less, optimum recording can be achieved even with the low recording magnetic field.

The thickness of the oxidized area was found by preparing a plurality of optical discs, in which the oxygen content of the oxidized area was constant at X atom % and the thickness of the oxidized area was varied, and by measuring the CN ratio for the recording magnetic field of 150 Oe of the optical discs. The results are shown in FIG. 10.

Figure 10:
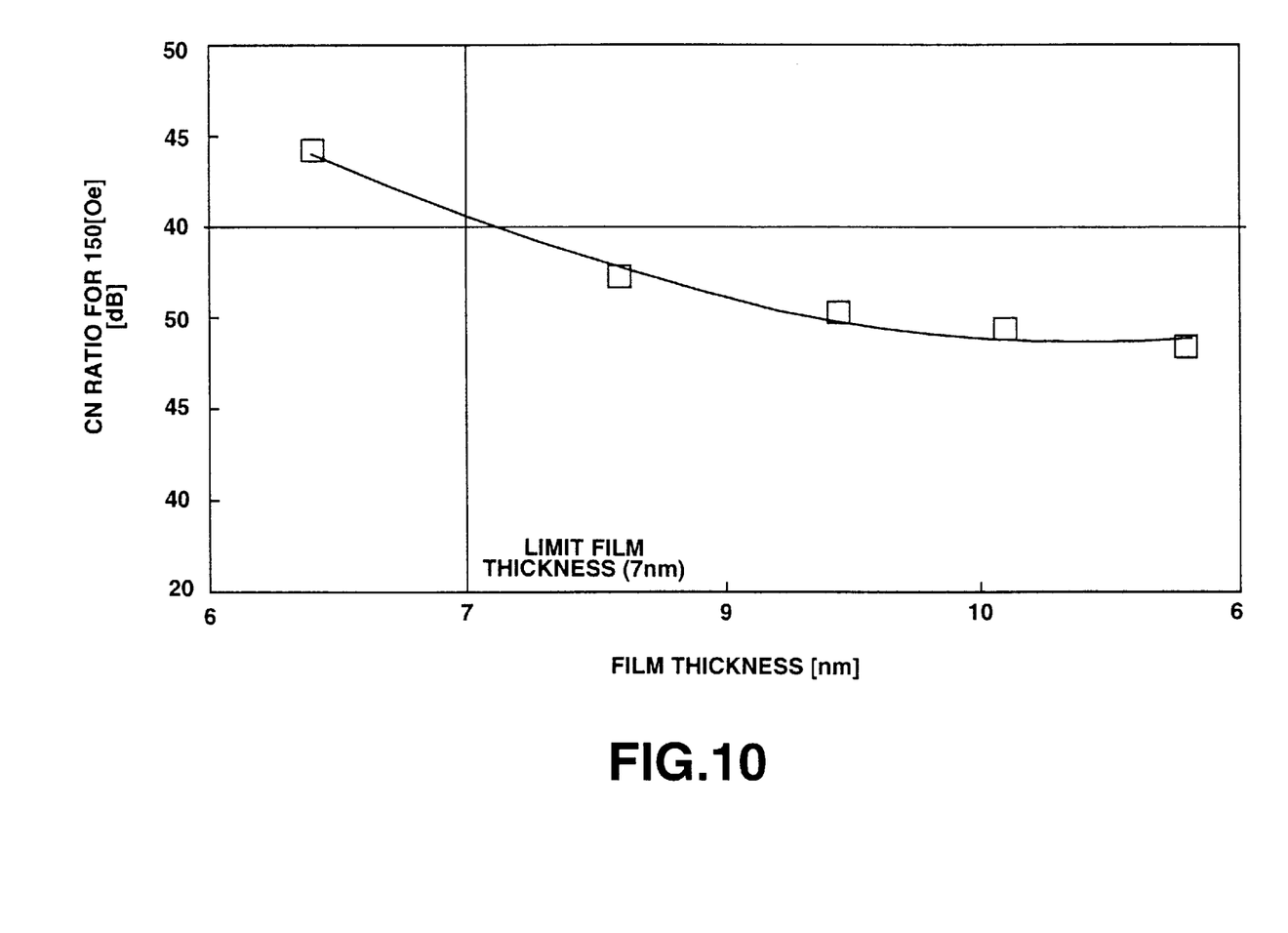
FIG. 10 is a graph showing the relation between the thickness of an oxidized area and the CN ratio.

As may be seen from FIG. 10, it is when the thickness of the oxidized area is 7 nm or less that the CN ratio at the recording magnetic field of 150 Oe is 40 dB or higher. Stated differently, should the thickness of the oxidized area of the optical disc 1 be 7 nm, optimum recording can be achieved even with the low recording magnetic field.

Thus, with the present optical disc 1, magnetic characteristics of the first and second rare earth-transition metal alloy films 4, 5 can be improved by setting the oxygen content of the oxidized area formed on the interface between the first and second rare earth-transition metal alloy films 4, 5 to 2.5 atom % and by setting the thickness of this oxidized area to 7 nm or less. That is, if, in the present optical disc 1, the oxygen content and thickness of the oxidized area are set to predetermined values, optimum recording can be realized even with the low recording magnetic field.

The manufacturing method for an optical disc according to the present invention is applied to manufacturing the above-described optical disc.

With the present method, the first dielectric film 3 of $Si_3N_4$ is first formed on the disc-shaped substrate 2. On the first dielectric film 3, the first rare earth-transition metal alloy film 4 and the second rare earth-transition metal alloy film 5 are formed in this order. On the second rare earth-transition metal alloy film 5, the second dielectric film 6 and the reflective film 7 are formed in this order to form the optical disc 1. With this technique, thin-film forming techniques, such as sputtering or vacuum evaporation, are used for forming the respective layers.

In the present technique, an oxidized area is formed on an interface between the first rare earth-transition metal alloy film 4 and the second rare earth-transition metal alloy film 5. This oxidized area is formed at the time of forming the first rare earth-transition metal alloy film 4 by ambient oxygen or water mixing into the vicinity of the surface of the first rare earth-transition metal alloy film 4. That is, rare earth elements are selectively oxidized to form an oxidized area by oxygen mixing to the interface between the first rare earth-transition metal alloy film 4 and the second rare earth-transition metal alloy film 5.

With the present technique, the first rare earth-transition metal alloy film 4 and the second rare earth-transition metal alloy film 5 are formed so that the content of oxygen of the oxidized area is 2.5 atom % or less and so that the thickness of the oxidized area will be 7 nm or less.

Figure 11:
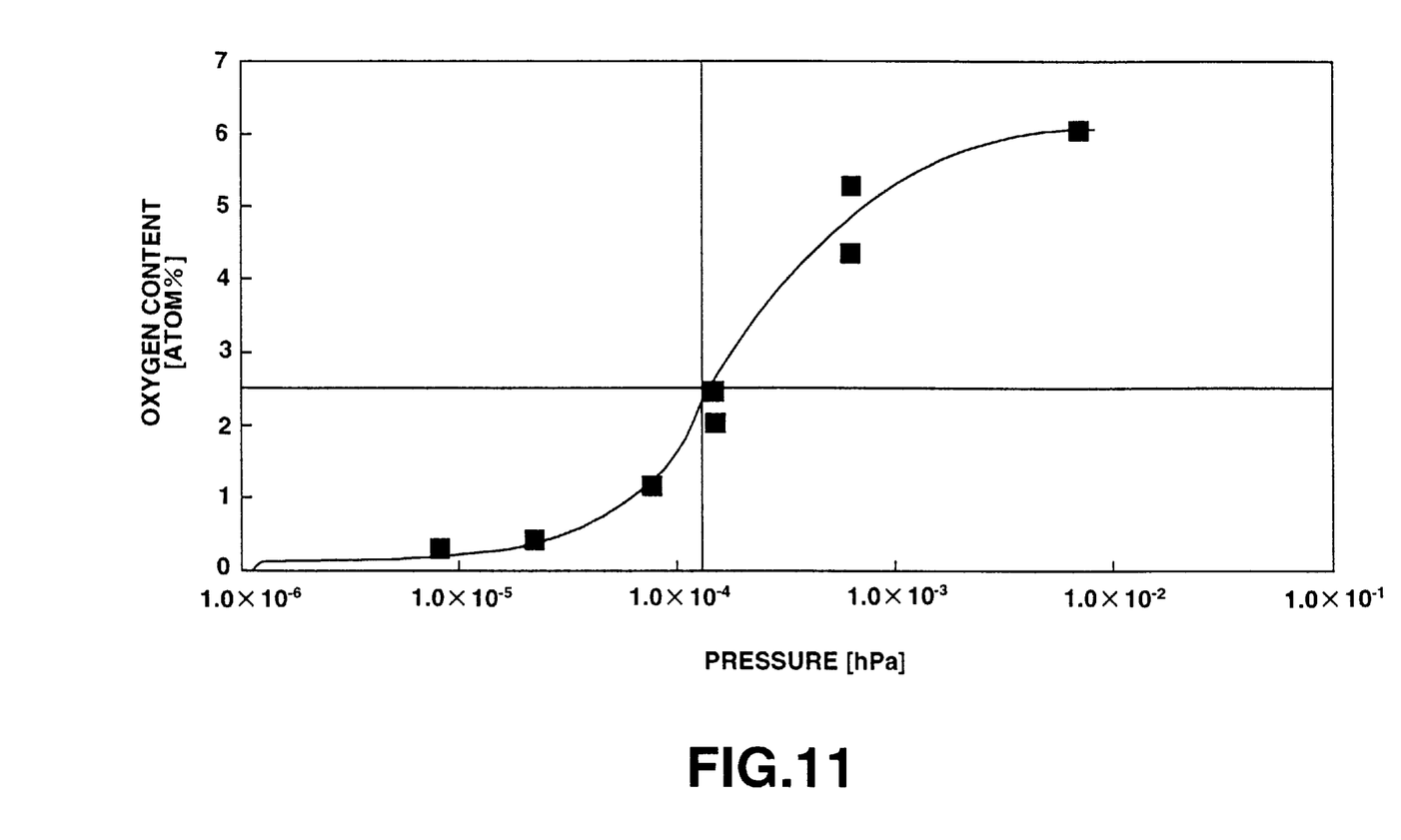
FIG. 11 is a graph showing the relation between the pressure in a chamber and the oxygen content in the oxidized area in connection with an optical disc manufacturing method according to the present invention.

Specifically, with the present technique, the first and second rare earth-transition metal alloy films are formed in a high vacuum chamber using a sputtering method. FIG. 11 shows the relation between the pressure in the chamber and the oxygen content in the oxidized area. As may be seen from FIG. 11, the pressure in the chamber is preferably not higher than $1.0 \times 10^{-4}$ [hPa]. That is, by setting the pressure in the chamber to not higher than $1.0 \times 10^{-4}$ [hPa], the oxygen content of the oxidized area can be controlled to be not higher than 2.5 atom %.

Thus, by controlling the pressure in the chamber in the course of forming the first and second rare earth-transition metal alloy films, the oxidized area on the interface between the first rare earth-transition metal alloy film 4 and the second rare earth-transition metal alloy film 5 can be formed to a desired state, as discussed previously.

With the present technique, since the oxidized area on the interface between the first rare earth-transition metal alloy film 4 and the second rare earth-transition metal alloy film 5 is of the desired oxygen content and of desired thickness, a large exchange reciprocal action can be generated between the first rare earth-transition metal alloy film 4 and the second rare earth-transition metal alloy film 5. This optimizes the magnetic characteristics of the films 4 and 5, so that, with the present technique, an optical disc can be manufactured on which optimum recording can be achieved even with the low recording magnetic field.

What is claimed is:

1. An optical disc comprising:

a first rare earth-transition metal alloy film containing rare earth elements and transition elements; and a second rare earth-transition metal alloy film layered on said first rare earth-transition metal alloy film, said second rare earth-transition metal alloy film having a composition different from that of said first rare earth-transition metal alloy film and containing rare earth elements and transition elements; wherein an oxidized area defined between said first rare earth-transition metal alloy film and the second rare earth-transition metal alloy film has an oxygen content not higher than 2.5 atom % and a thickness not larger than 7 nm.

2. The optical disc according to claim 1 wherein said first rare earth-transition metal alloy film is a GdFeCo alloy film and wherein said second rare earth-transition metal alloy film is a TbFeCo film.

3. A method for producing an optical disc comprising:

a step of forming on a substrate a first rare earth-transition metal alloy film containing rare earth elements and transition elements; and a step of forming a second rare earth-transition metal alloy film on said first rare earth-transition metal alloy film so that an oxidized area on an interface between said first rare earth-transition metal alloy film and the second rare earth-transition metal alloy film will be 7 nm or less and so that the oxygen content in an oxidized area will be 2.5 atom % or less.

4. The method according to claim 3 wherein said first rare earth-transition metal alloy film and the second rare earth-transition metal alloy film are formed in an atmosphere of $1.0 \times 10^{-4}$ [hPa] or less.

* * * * *